United States Patent [19]
Bruno

[11] Patent Number: 5,405,107
[45] Date of Patent: Apr. 11, 1995

[54] RADAR TRANSMITTING STRUCTURES

[76] Inventor: Joseph W. Bruno, 7 Corbin Ave., Shirley, N.Y. 11967

[21] Appl. No.: 943,013

[22] Filed: Sep. 10, 1992

[51] Int. Cl.[6] ............................................... B64C 1/36
[52] U.S. Cl. .................................. 244/117 R; 343/705; 343/708; 244/133
[58] Field of Search ................. 244/12.1, 12.4, 13.3, 244/117 A, 119, 123; 343/708, 705; 428/113, 48; 342/1, 2, 3, 5

[56] References Cited

U.S. PATENT DOCUMENTS

| | | | |
|---|---|---|---|
| 4,116,405 | 9/1978 | Bacchi et al. | 246/12.4 |
| 4,186,400 | 1/1980 | Cermigani et al. | 343/708 |
| 4,249,174 | 2/1981 | Lucchi et al. | |
| 4,256,790 | 3/1981 | Lackman et al. | 244/133 |
| 4,336,543 | 6/1982 | Ganz et al. | 343/705 |
| 4,348,680 | 9/1982 | Collier | |
| 4,539,253 | 9/1985 | Hirschbaehler et al. | 244/119 |
| 4,641,796 | 2/1987 | Feifel | 244/123 |
| 4,662,587 | 5/1987 | Whitener | 244/123 |
| 4,811,540 | 3/1989 | Kallies et al. | 244/123 |
| 4,885,199 | 12/1989 | Corbin et al. | 244/133 |
| 4,956,393 | 9/1990 | Boyd et al. | 244/133 |
| 5,151,707 | 9/1992 | Kumpfbeck et al. | 343/705 |
| 5,184,141 | 2/1993 | Connolly et al. | 343/708 |

FOREIGN PATENT DOCUMENTS

| | | | |
|---|---|---|---|
| 162075 | 3/1955 | Australia | 343/708 |
| 1430338 | 3/1976 | United Kingdom. | |
| 8801104 | 2/1988 | WIPO. | |

Primary Examiner—Galen L. Barefoot

[57] ABSTRACT

Internal conformal antenna arrays are mounted in aircraft aerosurface and fuselage primary and secondary load carrying structures. These radar transmitting structures are dual role structures capable of efficiently transmitting and receiving radio frequency energy, and efficiently carrying and transmitting aerodynamic loads. The internal conformal antenna arrays are mounted in the leading and trailing edges of the wings, in the empennage, and behind the outer shell of the fuselage. In order to achieve radar transmitting structures capable of transmitting radio frequency energy and meeting primary aerodynamic load carrying requirements, ceramic, quartz, or silicone-carbide fiber-reinforced organic matrix composites are combined with advanced structures technology.

10 Claims, 6 Drawing Sheets

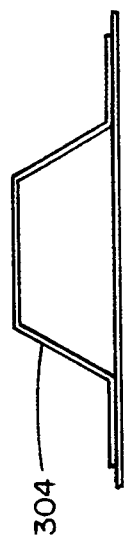
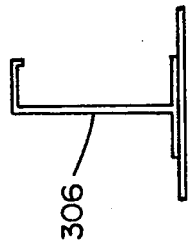
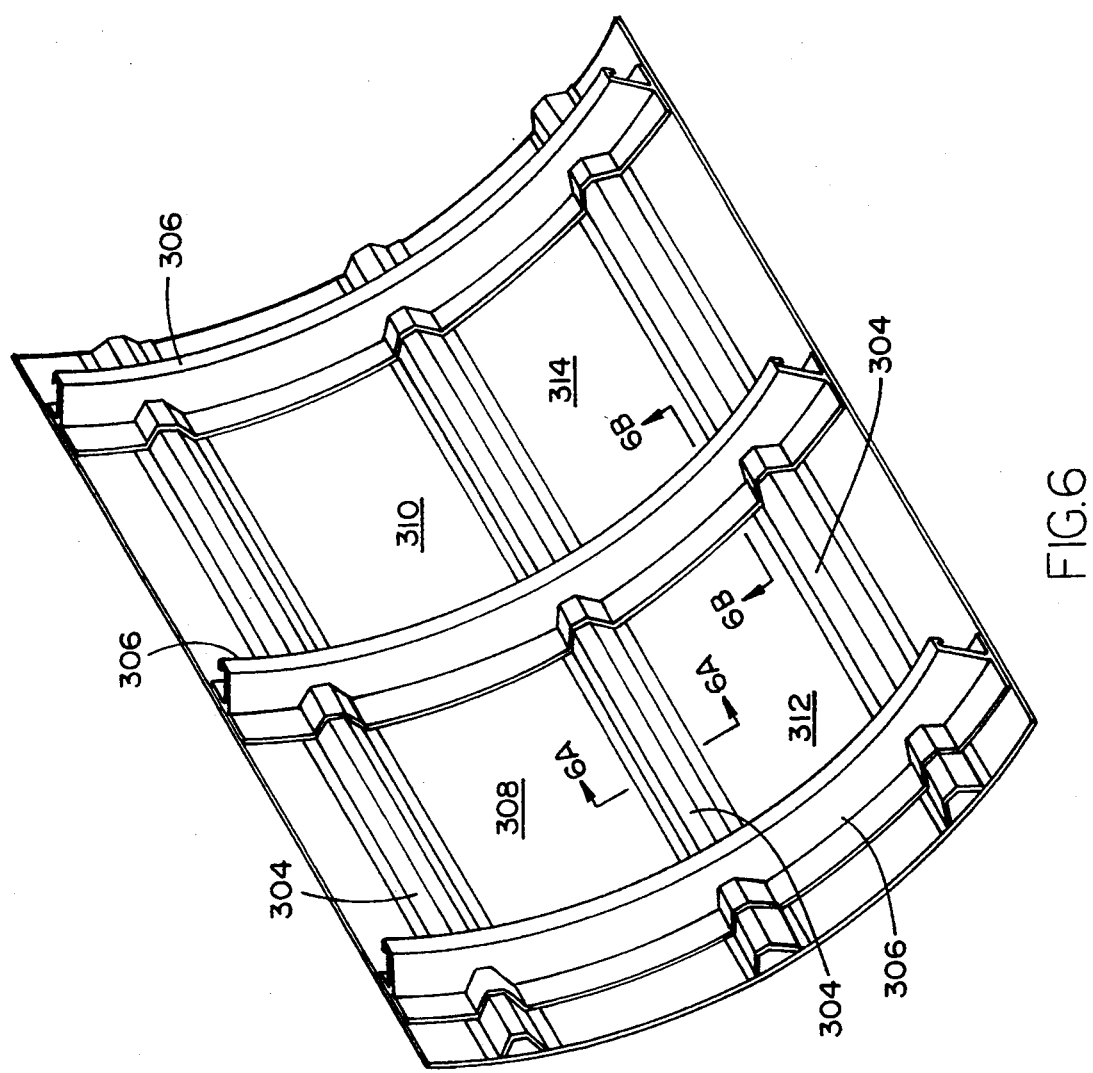

RADAR TRANSMITTING STRUCTURES

BACKGROUND OF THE INVENTION

1. Field of the Invention

The present invention relates to radio frequency (RF) transmitting material and structure combinations, and more particularly, to dual role structures capable of efficiently transmitting and receiving RF energy, and efficiently carrying and transmitting aerodynamic loads which occur on the primary load carrying structures of aircraft. RF transmitting materials having improved mechanical properties are combined with advanced structures technology to obtain efficient and low weight radar-tailored aerosurfaces and fuselage outer shell segment primary structures for use in a multitude of aircraft.

2. Discussion of the Prior Art

A significant portion of the present and future technology needed by such groups as the Department of Defense and NASA includes design, development and systems integration of mechanically and electrically efficient structures which serve as platforms for a variety of specialized electronic missions including Airborne Early Warning, Anti-Submarine Warfare, Electronic Warfare and military and civil surveillance. The increasing need for near future multi-mission platforms places increasing demands on the particular structure to not only carry primary and secondary aerodynamic loads efficiently, but to also transmit and receive RF energy with minimum losses.

The aircraft industry is a field in which the weight of any component and of any part that is utilized on an aircraft becomes an important factor in its design. In this particular field, it is also required that the stability and dimensional integrity of the aircraft remain constant. This means that in the case of an antenna system, the antenna system must be capable of taking up aerodynamic loads, accelerations on take-offs, launchings or the like and decelerations on landings. Specifically, such an antenna system has to remain stable with regard to any tendency toward deformation, for example, on account of low frequency oscillation.

In the past, antennas suitable for airborne radar or electronic applications were often mounted externally of the typical aerodynamic frame of an aircraft. These structures had to be of relatively heavy construction to withstand the aerodynamic forces of flight. As a result of the relatively high weight and interaction with the airstream of such structures, overall aircraft weight and flight performance were compromised. The design of antenna systems utilized by aircraft always involves a compromise of weight and size to avoid interference with aircraft aerodynamics. In addition, one does not want to interfere with the geometry of the aircraft.

More recently, antenna systems such as phased array antennas for improved scanning have been conformally integrated into airframe structures such as wings to improve aircraft performance while maintaining high radar efficiency. The prior art contains references which disclose the general concept of having antenna arrays housed within an aircraft surface. Included in this group of references are U.S. Pat. Nos. 4,186,400 and 4,514,734 both to Cermignani et al., 4,749,997 to Camonico, 4,116,405 to Bacchi et al. and 4,336,543 to Ganz et al., which specifically disclose the placement of antenna array elements along the leading edge of an aircraft wing. Additionally, U.S. Pat. Nos. 4,912,477 to Lory et al. and 4,872,016 to Kress disclose the placement or positioning of antenna elements within a horizontal stabilizer and fuselage structure. Although each of these references disclose conformal radar antenna systems, none of the references provide for conformal radar antenna systems to be placed or positioned within primary aerodynamic load carrying structures. The positioning of radar antenna systems within primary aerodynamic load carrying structures offers the advantage of a reduction in weight, the maximization of the structural efficiency of the aircraft and the maximization of the efficiency of the radar antenna system.

Presently, RF transmitting material/structures are restricted to non-primary or low level load carrying applications, as indicated by the above-cited prior art references, due to the material of construction which typically has low stiffness characteristics, and marginal strength. Weight penalties associated with the application of the current materials to primary aerodynamic load carrying structural applications is prohibitive. Therefore, new RF transmitting materials with significantly improved mechanical properties and novel design approaches are a critical need. These newer/emerging material systems have the potential to become efficient RF transmitting primary structures.

SUMMARY OF THE INVENTION

The present invention is directed to an aircraft having internal conformal antenna arrays mounted in aerosurface and fuselage primary and secondary load carrying structures, namely, the wings, fuselage, and empennage. Accordingly, each structure which comprises an internal conformal antenna array becomes a radar transmitting structure of the aircraft. Each aerosurface comprises a leading and trailing edge, and a torque box. The leading and trailing edges are constructed from an RF energy transmissive material capable of carrying and transmitting primary aerodynamic loads, generating lift, and housing the internal conformal antenna arrays. The torque box is also designed for carrying and transmitting primary aerodynamic loads. The torque box is positioned between the leading and trailing edges. Forward and rear spars are positioned at the junction where the torque box mates with the leading and trailing edges respectively. The torque box, and the leading and trailing edges are fastened to the upper portion of the spar, or spar cap, by a mechanical fastening means such as bolts. In order to create additional space for the internal conformal antenna arrays, the forward spar is moved a predetermined distance aft of where it normally would be located, and the rear spar is moved a predetermined distance forward of its normal position. Accordingly, the leading and trailing edges become primary aerodynamic load carrying structures. The aerosurfaces also incorporate softening strips embedded directly into the skins of the leading and trailing edges, and the torque box where each is connected to a spar. These softening strips enable the aerosurfaces to tolerate high levels of strain.

The fuselage is also designed to house internal conformal antenna arrays in its outer shell. The fuselage is constructed from a plurality of longitudinal stiffeners which run the length of the fuselage, and a plurality of minor frames which run perpendicular and are connected to the longitudinal stiffeners. If an internal conformal antenna array is mounted within a cell formed by the intersection of the longitudinal stiffeners and minor frames, an RF transmissive material is utilized as the skin of the fuselage.

The radar transmitting structures of the present invention combine state of the art RF transmitting materials with advanced structures technologies to obtain efficient and low weight radar tailored aerosurfaces and fuselage outer shell segment primary structures. Multi-mission electronic platform/surveillance aircraft and advanced tactical fighter/attack aircraft are designed with primary and secondary structures which perform the dual role function of efficiently transmitting aerodynamic loads and RF energy by designing wing, empennage and fuselage structures with RF transmissive materials capable of transmitting sustained aerodynamic loads.

The radar transmitting structures of the present invention are designed in a manner, and constructed from composite materials, such that internal conformal antenna arrays can be mounted therein with no loss to radar scanning efficiency due to interference from the aircraft. The radar transmitting structures can be utilized on any type of aircraft design including aircraft having a wing design of the straight taper, aft sweep, cranked/cranked arrow, or variable sweep type with either fixed leading and/or trailing edge structures or movable leading and/or trailing edge higher lift and maneuverability device structures. The radar transmitting structures have maximum structural efficiency, increased durability, strength and damage tolerance while maintaining a reduced weight.

The application of high strain wing technology provides for aerosurface structures with design ultimate strain levels increased approximately fifty percent over standard composite materials wing technology, thereby resulting in light weight durable damage tolerant radar transmitting structures. Additionally, low density skin stabilization techniques and the use of high performance, low dielectric fiber technology provide for easy to maintain and affordable radar transmitting structures for use in present and future aircraft.

BRIEF DESCRIPTION OF THE DRAWINGS

FIGS. 6, 6A and 6B are diagrammatic representations of a section of an RF transparent fuselage outer shell structure in accordance with the present invention.

DETAILED DESCRIPTION OF THE PREFERRED EMBODIMENTS

A significant portion of future Navy and Airforce advanced tactical fighter/attack and multi-mission electronic platform/surveillance aircraft primary and secondary structures will have to perform the dual function of efficiently transmitting aerodynamic loads and RF energy. Additionally, mission radius and/or time on station requirements will necessitate that fuel be a relatively large fraction of the vehicle's gross takeoff weight, thereby placing severe weight constraints on the airframe. Achieving the upper limit to maximum structural efficiency is of prime importance; however, these structures must also be durable, have long life, and be affordable.

To achieve the desired results, internal conformal antenna arrays are installed in the primary and secondary structures of multi-mission aircraft by utilizing state of the art RF transmissive materials which are specifically selected to transmit aerodynamic loads and RF energy efficiently. Primary and secondary aerodynamic load carrying structures are distinguishable in that if a primary aerodynamic load carrying structure is lost or damaged, safety of flight is affected. The determination of whether a particular structure is a primary or secondary aerodynamic load carrying structure generally depends upon the type of aircraft; however, typical secondary aerodynamic load carrying structures include the fixed leading and trailing edges of the wing and empennage, the leading and trailing edge high lift device surfaces of the wing and empennage, the control surface drive mechanisms, and radomes and rotodomes, and typical primary aerodynamic load carrying structures include the wing torque box, the empennage torque box and various fuselage segments.

Figure 1:
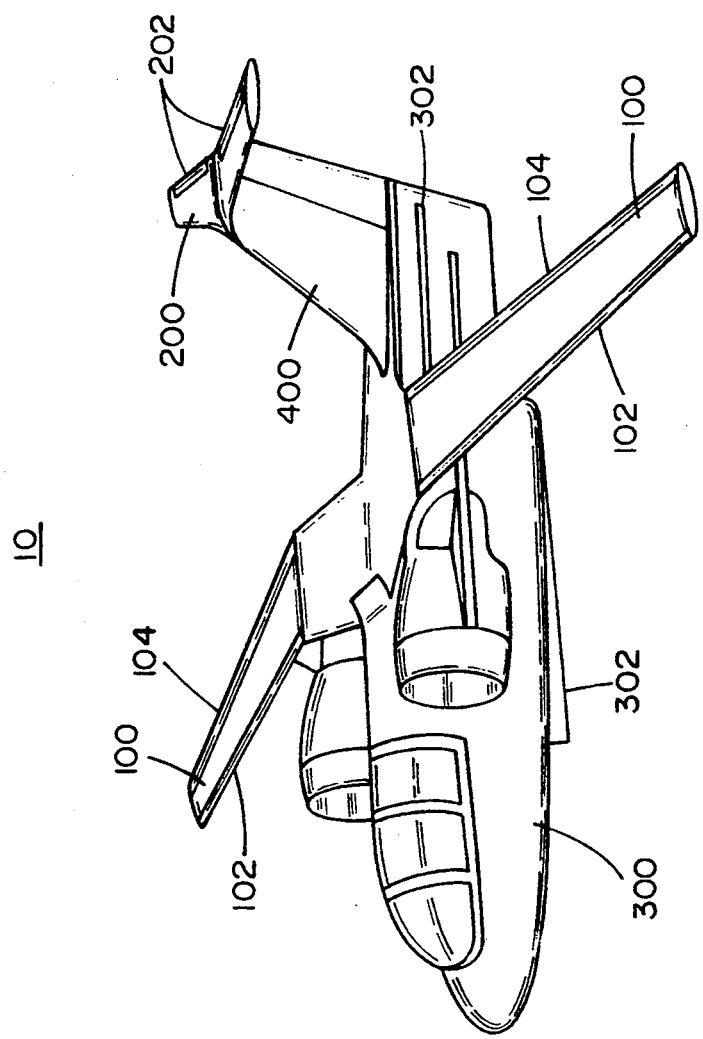
FIG. 1 is an illustration of an aircraft having the radar transmitting structures of the present invention incorporated into the aerosurfaces and fuselage of the aircraft.

FIG. 1 illustrates a typical multi-mission aircraft 10 having internal conformal antenna arrays mounted within primary and secondary structures of the aircraft. The internal conformal antenna arrays are mounted in the leading and trailing edges 102 and 104 of the wings 100, the trailing edges 202 of the horizontal stabilizer 200, and in the outer shell structure 302 of the fuselage 300.

Figure 2:
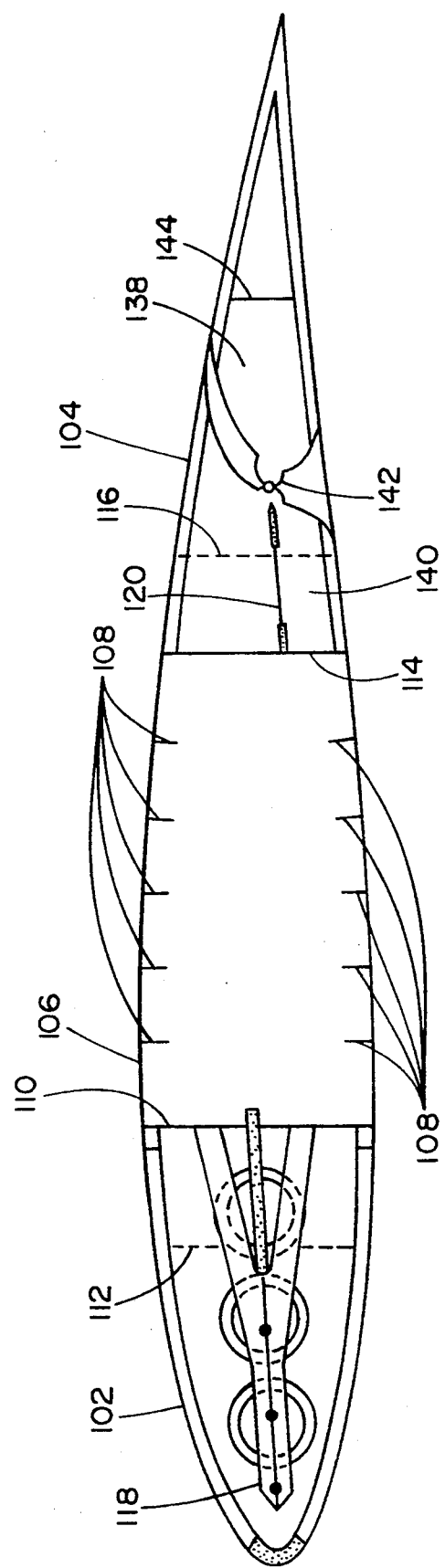
FIG. 2 is a sectional view of one embodiment of the radar transmitting structures of the present invention mounted within an aircraft wing.

Referring to FIG. 2, there is shown a cross section of one of the wings 100 of the aircraft 10 illustrated in FIG. 1. The wing 100 is designed utilizing a basic three cell structure, comprising a leading edge 102, a trailing edge 104, a torque box 106 and forward and rear spars 110 and 114 for support. The leading and trailing edges of wings in combination with the torque box define the shape of the airfoil. In addition, leading and trailing edges of the wing are designed to generate high lift characteristics. The leading and trailing edges can be fixed or movable. Moveable leading edge and trailing edges comprise high lift devices such as slats, ailerons and flaps which are utilized for generating additional lift for the aircraft or providing control during flight. Typically, the leading edge comprises slats and the trailing edge comprises flaps or ailerons. The torque box of a wing is the primary aerodynamic load carrying structure of the wing which is specifically designed to carry and transmit the bending, torsion and vertical shear forces acting on the wings during all phases of flight. In the particular design illustrated in FIG. 2, the leading edge 102 is fixed and the trailing edge 104 is a control surface, however, the internal conformal arrays can be mounted in either or both sections as is subsequently described. In standard three cell wing structures, the torque box 106 is the only primary aerodynamic load carrying surface of the wing 100. Accordingly, to provide additional strength and rigidity in the torque box 106, stiffening blades 108 are mounted on the inner surfaces of the torque box 106. However, in this particular wing 100, the forward spar 110 is positioned aft of its normal or originally designed position, which is indicated by dotted line 112, and the rear spar 114 is moved forward of its normal or originally designed position, which is indicated by dotted line 116. The originally designed position of the forward and rear spars varies with the wing design. In positioning the forward spar 110 aft of its normal position and the rear spar 114 forward of its normal position, additional space is created for the placement of larger internal conformal antenna arrays having greater scanning capability. However, in creating the additional space, the leading and trailing edges 102 and 104 comprise a significant portion of the total wing area and therefore become primary aerodynamic load carrying structures. The repositioning of the spars 110 and 114 is made possible by the use of specific materials as is subsequently described. The repositioning of the spars 110 and 114 depends upon the size of the internal conformal antenna array and the architecture of the wing.

In this particular wing design, the forward spar 110 and the rear spar 114 are moved an equal distance in from each end of the wing 100. Specifically, each spar 110 and 114 is moved inward twenty-five percent of the overall cord length of the wing 100. As is discussed above, the repositioning of the spars 110 and 114 depends upon the size of antenna array and wing architecture. However, the same principle applies to any type of wing architecture, including straight taper, aft sweep, variable sweep and cranked/cranked arrow.

A first internal conformal antenna array 118 is mounted in the leading edge 102 of the wing 100 and a second internal conformal antenna array 120 is mounted in the trailing edge 104 of the wing 100. The internal conformal arrays 118 and 120 are mounted to the forward and rear spars 110 and 114 respectfully, which also act as the ground plane for the antennas. As illustrated in the figure, both the leading and trailing edges 102 and 104 are shown as having outer covers which comprise inner and outer skins, whereas the torque box 106 is of single layer design. However, if no internal conformal antenna arrays are placed in either the leading or trailing edges 102 and 104, a single layer outer cover or surface can be utilized. A detailed description of the construction of the various surfaces is given with respect to FIG. 3.

Figure 3:
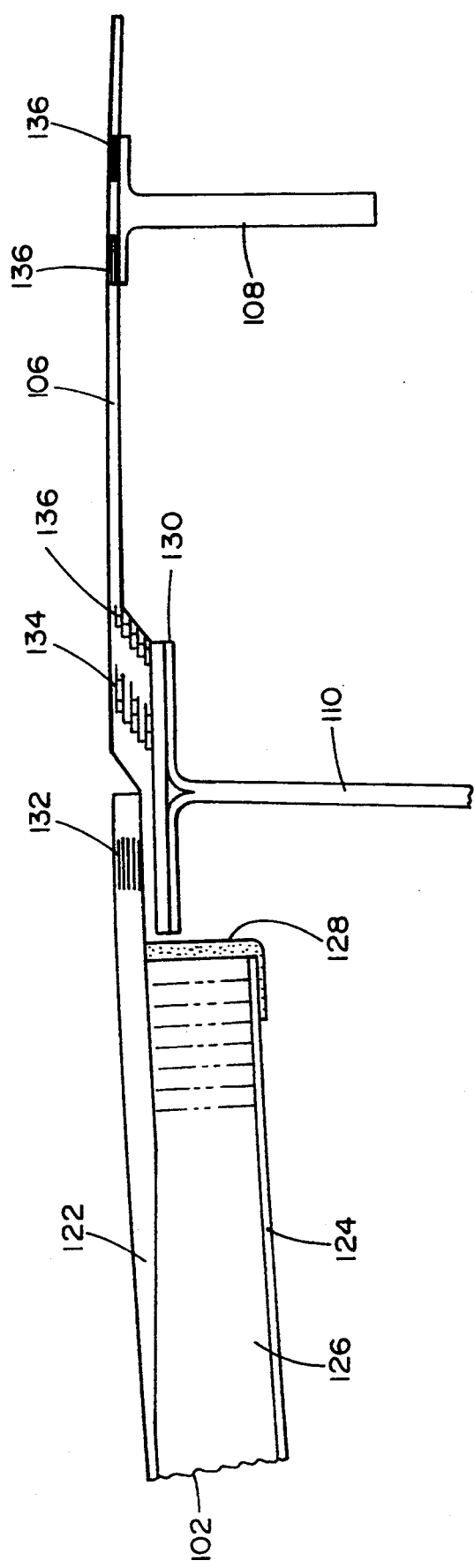
FIG. 3 is a diagrammatic representation of a section of an aircraft wing in accordance with the present invention illustrating the construction of a radar transmitting structure.

In FIG. 3, there is shown a detailed drawing illustrating a section of the leading edge 102 and the torque box 108 of the wing 100. The outer and inner skins 122 and 124 of the leading edge 102 are formed from a radar transmissive material having a high structural strength and stiffness. The primary design criterion in choosing the particular material to utilize is that it be capable of efficiently transmitting RF energy and to meet primary aerodynamic load carrying requirements. Certain geometries, for example, physical shape and proportions of structural elements, are more efficient than others for a given type of mechanical and electrical loading. Within each shape there is an optimum configuration that yields the least weight. In order to obtain an optimum design within the various constraints, specific weight, electrical efficiency, durability, damage tolerance and supportability criterion requirements are chosen. To meet these specific design criterion, ceramic fiber-reinforced organic matrix composites, and silicone-carbide fiber-reinforced organic composites are chosen. Accordingly, the outer and inner skins 122 and 124 are formed from either Nextel 312/epoxy which is a product of the 3M Company or HVR Nicalon® which is a product of Dow Corning. In the space between the outer and inner skins 122 and 124, a loss-less dielectric material 120, for example, Rohacel structural foam, or Syn-core® which is manufactured by Hysol Inc., is placed. Typically, in this type of application, a honeycomb type material is utilized; however, the structural foam 126 provides certain advantages over existing honeycomb technology. The structural foam 126 does not absorb large concentrations of water which tends to collect and freeze in typical honeycomb type constructions. Accordingly, there is improved electrical and structural performance of the leading edge 102. Basically, the use of high performance, low dielectric fiber technology provides for increased toughness and hot/wet stability. The sandwich type construction of the surface structure of the leading edge 102 is held together by a laminate structure 128.

The forward spar 110 is formed from a graphite/epoxy such as IM6/3501-6 or IM7/8552 which is manufactured by Hercules Inc., and is formed in a T-shape structure. Other graphite/epoxies are available such as IM7/977, fabricated by Fiberite Inc. The upper portion of the spar 110, or more commonly referred to as the spar cap 130, is positioned in the region forming the junction between the leading edge 102 and the torque box 106. Each of the spars 110 and 114 (shown in FIG. 2) are coated with an aluminum foil or aluminum flame spray. The spars 110 and 114 are coated with aluminum so that they function as ground planes for the conformal antenna arrays as well as a mounting anchor. The skin of the torque box 106 is also formed from a graphite epoxy such as IM7/8552 or IM7/977, and is attached to the spar cap 130 by means of mechanical fasteners such as bolts, which are not shown in the figure. Softening strips 132 and 134 which are formed from a fiberglass/epoxy, such as S2-GL/SP 337 which is manufactured by the 3M Company are laminated directly into the outer skin 122 of the leading edge 102 and the skin of the torque box 106 where each is connected to the spar cap 130. Softening strips are also inserted in the region of the rear spar cap which is not shown in this figure. These softening strips provide for what is known in the art as high strain technology wings. The application of high strain wing technology addresses notch sensitivity/strain concentrations to permit maximum translation of composite material properties, and where possible, increase design ultimate strain levels by approximately fifty percent. Addressing strain concentrations, to achieve high strains results in durable damage tolerant radar transmitting structures.

The skin of the torque box 106 comprises fiberglass/epoxy crack arrestment strips 136 which are positioned in proximity to the forward and rear spars 110 and 114 (as shown in FIG. 2), and each of the stiffening blades 108. The crack arrestment strips 136 are utilized to prevent cracks in the skin and delamination from growing past the strips 136 so that major structural damage is prevented. The stiffening blades 108 are connected to the skin of the torque box 106 by means of a KEVLAR®/epoxy stitching which is manufactured by Dupont. The stiffening blades 108 are sewn into the skin of the torque box 106 by the KEVLAR®/epoxy stitching.

Referring back to FIG. 2, the material and structure combination which is utilized in the design and construction of the leading edge 102 is utilized in the construction of the trailing edge 104 of the wing 100. Specifically, a double skin construction having a loss-less dielectric sandwiched therebetween, fiberglass/epoxy crack arrestment strips, and fiberglass/epoxy softening strips, are utilized in the construction of the trailing edge 104. In this particular type of design, the fact that the trailing edge 104 comprises a highlift device 138 is of no consequence in the choice of materials. In addition, the connection of the trailing edge 104 to the torque box 106 is identical to the connection of the leading edge 102 to the torque box 106 even though the trailing edge 104 comprises a high lift device 138; however a drive mechanism which is not shown, is also connected to the rear spar 114. The drive mechanism, familiar to one skilled in the art, is operable to position the high lift device 138 at various degrees above or below the wing 100 depending upon the particular application or maneuver desired by the pilot. The internal conformal antenna array 120 is mounted in a fixed portion 140 of the trailing edge 104 and anchored to the rear spar 114 in the same manner as the internal conformal antenna array 118 is mounted in the leading edge 102.

To avoid interference with the radar scanning ability of the internal conformal antenna array 120, the high lift device 138 is constructed from the same material as that of the fixed portion 140. A connection device 142, which is generally a hinge type mechanism, is utilized to connect the fixed portion 140 to the high lift device 138 and is metal, or is formed from the same material as the forward and rear spars 110 and 114; namely, a graphite/epoxy. A spar 144 is utilized to provide additional support for the high lift device 138. The construction and connection of the spar 144 is identical to that of the construction and connection of the forward and rear spars 110 and 114 respectively. Accordingly, the internal conformal antenna array 120 has full scanning capability because all mounting and casing structures are formed from RF transmissive material.

It is to be understood that the drive mechanism may interfere with the scanning ability of the internal conformal antenna array 120 when scanning in certain directions. However, the drive mechanism is located in a fixed position and therefore will appear on the radar scope at a fixed location. Accordingly, when monitoring the radar scope, the drive mechanism may be ignored.

Figure 4:
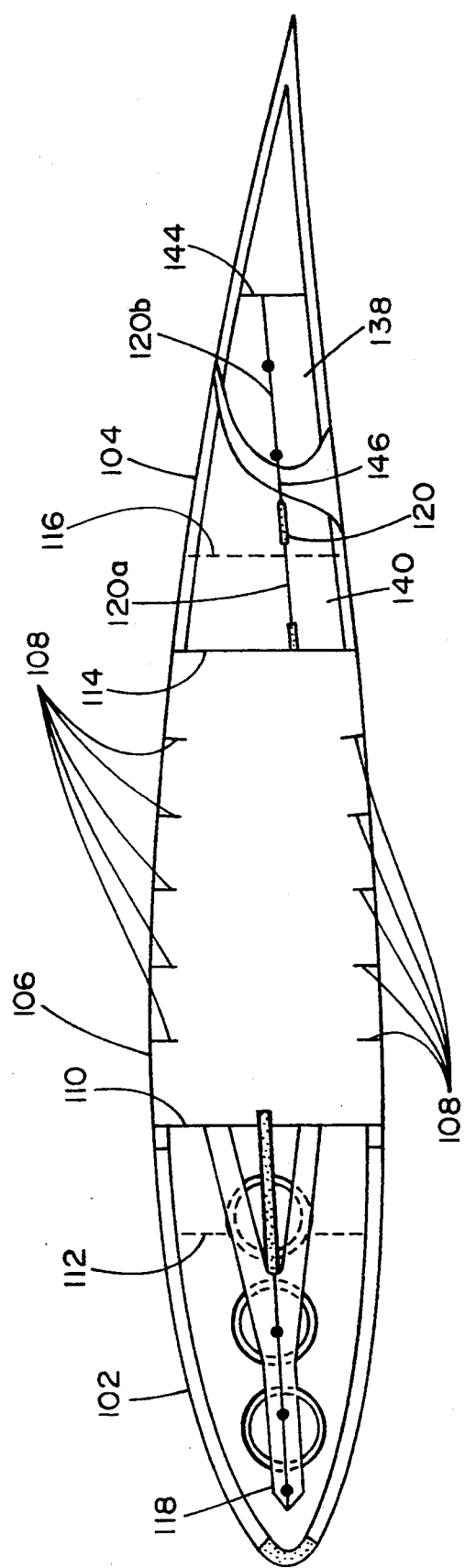
FIG. 4 is a sectional view of a second embodiment of the radar transmitting structures of the present invention mounted within an aircraft wing.

Referring to FIG. 4, there is shown a wing 100 having a trailing edge 104 comprising a high lift device 138 and an internal conformal array 120 mounted in the fixed portion 140 and in the high lift device 138. Due to the relative movement between the fixed portion 140 and the high lift device 138, a one piece continuous internal conformal antenna array 120 is not possible. Therefore, an RF link 146 is required between the two sections 120a and 120b of the internal conformal antenna array 120. The section 120a which is housed within the fixed portion 140 is mounted to the rear spar 114 as previously described, and the section 120b housed within the high lift device 138 is mounted to the spar 144. The mounting of the section 120b of the internal conformal antenna array 120 to the spar 144 is identical to that of the mounting of the section 120a to the rear spar 114.

Figure 5:
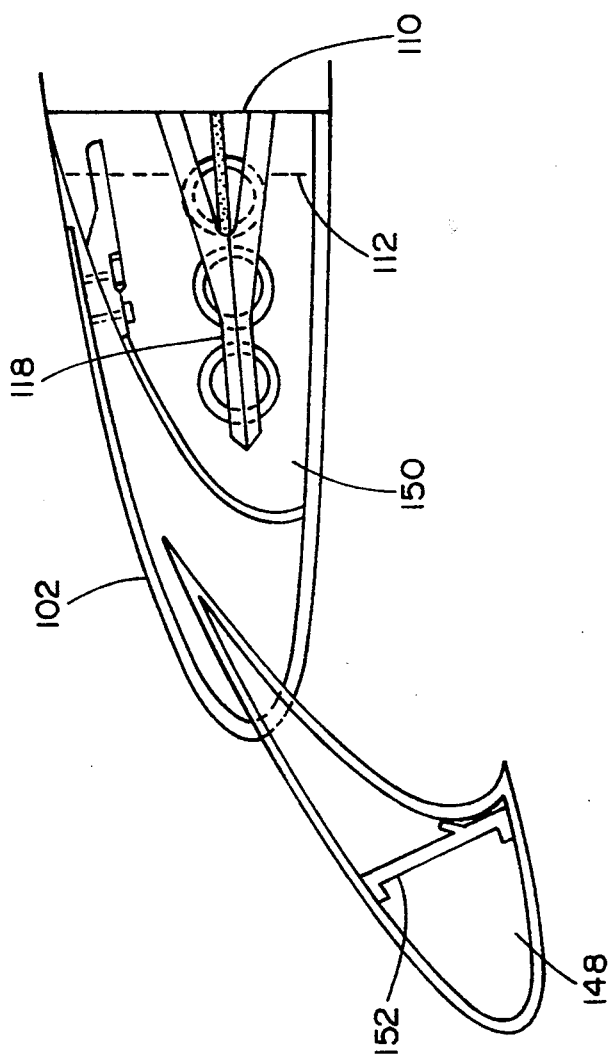
FIG. 5 is a sectional view of a third embodiment of the radar transmitting structures of the present invention mounted within an aircraft wing.

If the leading edge 102 of the wing 100 is moveable, as is illustrated in FIG. 5, the drive mechanism and the internal conformal antenna array would be mounted in the fixed portion of the leading edge 102. FIG. 5 illustrates a leading edge 102 having a leading edge flap 148 which is shown in the down position. The internal conformal antenna array 118 is housed within the fixed portion 150 and connected to the forward spar 110. To avoid interference with the radar scanning ability of the internal conformal antenna array 118, the flap 148 is constructed from the same material as the fixed portion 150. The flap 148 is formed from the same materials as the forward and rear spars 110 and 114 respectively. A spar 152 is utilized to provide additional support for the flap 148. The construction and connection of the spar 152 is identical to that of the construction and connection of the forward and rear spars 110 and 114.

A drive mechanism familiar to one skilled in the art, not shown, is utilized to actuate the control surface 148. It is to be understood this mechanism may also interfere with the scanning ability of the internal conformal antenna array 118 when scanning in certain directions. This problem is early overcome in a similar fashion as that of the drive mechanism for the trailing edge 104.

Additionally, this particular design is not limited to the wing 100. As is shown in FIG. 1, the internal conformal antenna arrays can be positioned in the horizontal stabilizer 200 using a construction identical to that as described in the context of the wing 100. In addition, although not shown in FIG. 1, an internal conformal antenna array can also be positioned in the vertical stabilizer 400 using an identical construction. However, it is important to note that it is not necessary to reposition any of the spars used in any of the aerosurfaces if the antenna array can be placed within the confines of a secondary structure.

In FIG. 6, a section of an RF transparent fuselage outer shell structure is shown. The basic fuselage structure comprises longitudinal stiffeners 304 which are formed from a graphite/epoxy such as IM6/3501-6, IM7/8552 or IM7/977, and minor frames 306 also formed from graphite/epoxy. The longitudinal stiffeners 304 run the length of the fuselage 300 and have a cross-sectional geometry as shown in section cutout A—A. The minor frames 306 run perpendicular to and are connected to the longitudinal stiffeners 306. The minor frames have a cross-sectional geometry as shown in section cutout B—B. An internal conformal antenna array can be positioned within any of the cells 308, 310, 312 and 314 formed between the minor frames 306 and longitudinal stiffeners 304. For example, a conformal antenna array placed within cell 310 could have a wide range of radiational angles. In any region or cell where an antenna array is mounted, the outer skin, which forms the cover of the fuselage 300, is formed from HVR Nicalon®, the same material utilized in the leading and trailing edges 102 and 104 of the wing 100. Although a single wall structure is shown in FIG. 4, a double wall construction identical to that of the leading and trailing edges can be utilized. The longitudinal stiffeners, minor frames and RF transmitting material are integrally cured in a single autoclave operation to eliminate the need for fasteners which can possibly interfere with RF transmissionability. The internal conformal antenna arrays are mounted directly to either the longitudinal stiffeners or the minor frames or both. However, a separate ground plane (not shown) must be utilized. The cells with no antenna arrays therein have outer skins formed from a graphite/epoxy such as IM 6/3501-6, IM7/8552 or IM7/977.

Although shown and described is what are believed to be the most practical and preferred embodiments, it is apparent that departures from specific methods and designs described and shown will suggest themselves to those skilled in the art and may be used without departing form the spirit and scope of the invention. The present invention is not restricted to the particular constructions described and illustrated, but should be construed to cohere with all modifications that may fall within the scope of the appended claims.

What is claimed is:

1. An aircraft having internal conformal antenna arrays mounted in aerosurface primary load carrying structures, said aerosurface comprising:
   (a) a leading edge constructed from a radio frequency energy transmissive material capable of carrying and transmitting primary aerodynamic loads, generating lift, and housing said internal conformal antenna arrays, said leading edge comprises an inner and outer skin formed from a ceramic fiber reinforced or silicone-carbide fiber reinforced epoxy, and a loss-less dielectric material being sandwiched between said inner and outer skin for increased toughness and hot/wet stability for said aerosurface;
   (b) a trailing edge for generating lift and comprising high lift devices for generating additional lift and providing control for said aircraft, said trailing edge being formed from a graphite/epoxy; and
   (c) a torque box for carrying and transmitting primary aerodynamic loads, said torque box and said leading edge mating at and being fastened to a forward spar by a first fastening means, and said torque box and said trailing edge mating at and being fastened to a rear spar by a second fastening means, said torque box comprises graphite/epoxy covers with integral stiffening blades protruding inwardly from said torque box covers for strengthening said torque box against bending, torsion and vertical sheer loads, said stiffening blades are sewn into torque box covers utilizing a KEVLAR®/epoxy stitching, and embedded fiberglass/epoxy crack arrestment strips positioned in proximity to said forward and rear spars and said stiffening blades for preventing structural cracks and delamination form from spreading.

2. The aircraft having internal conformal antenna arrays mounted in aerosurface primary load carrying structures according to claim 1, wherein said leading edge comprises high lift devices for generating additional lift and providing control for said aircraft.

3. The aircraft having internal conformal antenna arrays mounted in aerosurface primary load carrying structures according to claim 1, wherein said outer skin of said leading edge, said torque box cover and a trailing edge cover each comprise embedded fiberglass/epoxy softening strips where each are connected to the forward and rear spars, said fiberglass epoxy softening strips increase the strain efficiency of said aerosurface.

4. An aircraft having internal conformal antenna arrays mounted in aerosurface primary load carrying structures, said aerosurface comprising:
   (a) a leading edge constructed from a radio frequency energy transmissive material capable of carrying and transmitting primary aerodynamic loads, generating lift, and housing said internal conformal antenna arrays, said leading edge comprises an inner and outer skin formed from a ceramic fiber reinforced or silicone-carbide fiber reinforced epoxy, and a loss-less dielectric material being sandwiched between said inner and outer skin for increased toughness and hot/wet stability for said aerosurface;
   (b) a trailing edge constructed from a radio frequency energy transmissive material capable of carrying and transmitting primary aerodynamic loads, generating lift, and housing said internal conformal antenna arrays, said tailing edge comprises an inner and outer skin formed from a ceramic fiber reinforced or silicone-carbide fiber reinforced epoxy, and a loss-less dielectric material being sandwiched between said inner and outer skin for increased toughness and hot/wet stability for said aerosurface; and
   (c) a torque box for carrying and transmitting primary aerodynamic loads, said torque box and said leading edge mating at and being fastened to a forward spar by a first fastening means, and said torque box and said trailing edge mating at and being fastened to a rear spar by a second fastening means, said torque box comprises graphite/epoxy covers with integral stiffening blades protruding inwardly from said torque box covers for strengthening said torque box against bending, torsion and vertical sheer loads, said stiffening blades are sewn into said torque box covers utilizing a KEVLAR®/epoxy stitching, and embedded fiberglass/epoxy crack arrestment strips positioned in proximity to said forward and rear spars and said stiffening blades for preventing structural cracks and delamination from spreading.

5. The aircraft having internal conformal antenna arrays mounted in aerosurface primary load carrying structures according to claim 4, wherein said leading edge comprises high lift devices for generating additional lift and providing control for said aircraft, and said trailing edge comprises high lift devices for control of said aircraft.

6. The aircraft having internal conformal antenna arrays mounted in aerosurface primary load carrying structures according to claim 4, wherein said outer skin of said leading edge and said trailing edge, and said torque box cover each comprise embedded fiberglass/epoxy softening strips where each are connected to the forward and rear spar, said fiberglass softening strips increase the strain efficiency of said aerosurface.

7. An aircraft having internal conformal antenna arrays mounted in aerosurface and fuselage primary and secondary load carrying structures, said aircraft comprising:
   (a) a pair of wings each comprising a leading edge constructed from a radio frequency energy transmissive material capable of carrying and transmitting primary aerodynamic loads, generating lift, and housing said internal conformal antenna arrays, said leading edge comprises an inner and outer skin formed from a ceramic fiber reinforced or silicone-carbide fiber reinforced epoxy, and a loss-less dielectric material being sandwiched between said inner and outer skin for increased toughness and hot/wet stability for said wing, a trailing edge constructed from a radio frequency energy transmissive material capable of carrying and transmitting primary aerodynamic loads, generating lift, and housing said internal conformal antenna arrays, said trailing edge comprises an inner and outer skin formed from a ceramic fiber reinforced or silicone-carbide fiber reinforced epoxy, and a loss-less dielectric material being sandwiched between said inner and outer skin for increased toughness and hot/wet stability for said wing, and a torque box for carrying and transmitting primary aerodynamic loads, said torque box and said leading edge mating at and being fastened to a forward spar by a first fastening means, and said torque box and said trailing edge mating at and being fastened to a rear spar by a second fastening means, said torque box comprises graphite/epoxy covers with integral stiffening blades protruding inwardly from said torque box covers for strengthening said torque box against bending, torsion and vertical sheer loads, said stiffening blades are sewn into said torque box covers utilizing a KEVLAR ® epoxy stitching, and embedded fiberglass/epoxy crack arrestment strips positioned in proximity to said forward and rear spars and said stiffening blades for preventing structural cracks and delamination from spreading;

(b) a fuselage to which said pair of wings is connected, wherein at least a portion of an outer shell segment primary structure of said fuselage being utilized for housing said internal conformal antenna arrays, said fuselage comprises a plurality of longitudinal stiffeners running the length of the fuselage, a plurality of minor frames running perpendicular to and connected to said plurality of longitudinal stiffeners, and an outer skin covering said plurality of minor frames and longitudinal stiffeners, said longitudinal stiffeners and minor frames being formed from a graphite epoxy in a single autoclave operation, and (c) an empennage having a stabilizer comprising at least a leading edge constructed from a radio frequency energy transmissive material capable of carrying and transmitting primary aerodynamic loads, and housing said internal conformal antenna arrays.

8. The aircraft having internal conformal antenna arrays mounted in aerospace and fuselage primary and secondary load carrying structures according to claim 7, wherein said leading edges of said pair of wings each comprise high lift devices for generating additional lift and providing control for said aircraft, and trailing edges of said pair of wings each comprise high lift devices for generating additional lift and providing control for said aircraft.

9. The aircraft having internal conformal antenna arrays mounted in aerosurface and fuselage primary and secondary load carrying structures according to claim 8, wherein said outer skin of said leading and said trailing edges of said pair of wings and said torque box cover each comprise embedded/fiberglass epoxy softening strips where each are connected to the forward and rear spars, said fiberglass/epoxy softening strips increase the strain efficiency of said aerosurface.

10. The aircraft having internal conformal antenna arrays mounted in aerosurface and fuselage primary and secondary load carrying structures according to claim 9, wherein said outer skin of said fuselage is formed from a ceramic fiber reinforced or silicone-carbide reinforced epoxy in the region of said outershell segment primary structure of said fuselage being utilized for housing said internal conformal antenna arrays and from a graphite/epoxy elsewhere.

* * * * *